US 8,098,342 B2

(12) United States Patent
Lee

(10) Patent No.: US 8,098,342 B2
(45) Date of Patent: Jan. 17, 2012

(54) THIN FILM TRANSISTOR ARRAY PANEL COMPRISING A PIXEL ELECTRODE CONNECTED TO FIRST AND SECOND THIN FILM TRANSISTORS AND FORMED ON THE SAME LAYER AS THE SHIELDING ELECTRODE AND LIQUID CRYSTAL DISPLAY INCLUDING THE SAME

(75) Inventor: Baek-Woon Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 598 days.

(21) Appl. No.: 11/408,676

(22) Filed: Apr. 21, 2006

(65) Prior Publication Data
US 2006/0250537 A1    Nov. 9, 2006

(30) Foreign Application Priority Data
May 4, 2005    (KR) .................. 10-2005-0037519

(51) Int. Cl.
G02F 1/136 (2006.01)
G02F 1/1343 (2006.01)
(52) U.S. Cl. ........................... 349/48; 349/39
(58) Field of Classification Search .............. 349/48, 349/39
See application file for complete search history.

(56) References Cited

U.S. PATENT DOCUMENTS

| 6,115,017 A * | 9/2000 | Mikami et al. .......... 345/92 |
|---|---|---|
| 6,147,724 A | 11/2000 | Yoshii et al. |
| 6,404,466 B1 * | 6/2002 | Miyahara ............... 349/48 |
| 6,707,441 B1 * | 3/2004 | Hebiguchi et al. ........ 345/92 |
| 7,199,808 B2 * | 4/2007 | Yo .......................... 345/694 |
| 7,796,221 B2 * | 9/2010 | Kamada et al. ........ 349/139 |
| 2001/0035919 A1 * | 11/2001 | Zhang .................... 349/44 |
| 2004/0178409 A1 * | 9/2004 | Hong et al. ............ 257/59 |
| 2004/0217931 A1 * | 11/2004 | Shin ....................... 345/90 |
| 2005/0036091 A1 * | 2/2005 | Song ...................... 349/129 |
| 2005/0094038 A1 * | 5/2005 | Choi et al. .............. 349/12 |
| 2005/0110924 A1 * | 5/2005 | Kim et al. .............. 349/111 |
| 2006/0119756 A1 * | 6/2006 | Shin et al. .............. 349/38 |
| 2006/0274008 A1 * | 12/2006 | Lin et al. ................ 345/92 |

FOREIGN PATENT DOCUMENTS

| CN | 1458546 | 11/2003 |
|---|---|---|
| CN | 1550854 | 12/2004 |
| EP | 0569601 A1 | 11/1993 |
| JP | 04-318512 | 11/1992 |
| JP | 05-119346 | 5/1993 |
| JP | 09-265112 | 10/1997 |
| JP | 2002-358053 | 12/2002 |
| JP | 2003-233353 | 8/2003 |
| KR | 1998-079788 | 11/1998 |
| KR | 1020020018088 | 3/2002 |

* cited by examiner

Primary Examiner — Mark A Robinson
Assistant Examiner — Charles Chang
(74) Attorney, Agent, or Firm — F. Chau & Associates, LLC

(57) ABSTRACT

A liquid crystal display is provided, which includes a plurality of pixels including first and second thin film transistors, and a pixel electrode connected to the first and second thin film transistors, a first gate line transmitting a first gate signal and connected to the first thin film transistor, a second gate line transmitting a second gate signal and connected to the second thin film transistor, and a data line transmitting a data signal and connected to the first thin film transistor. The second thin film transistor receives a uniform voltage and transmits the uniform voltage to the pixel electrode according to the second gate signal.

12 Claims, 12 Drawing Sheets

THIN FILM TRANSISTOR ARRAY PANEL COMPRISING A PIXEL ELECTRODE CONNECTED TO FIRST AND SECOND THIN FILM TRANSISTORS AND FORMED ON THE SAME LAYER AS THE SHIELDING ELECTRODE AND LIQUID CRYSTAL DISPLAY INCLUDING THE SAME

BACKGROUND OF THE INVENTION (a) Field of the Invention

The present invention relates to a thin film transistor array panel and a liquid crystal display including the same.

(b) Description of Related Art

Liquid crystal displays (LCDs) are widely used flat panel displays. An LCD includes two panels comprising field-generating electrodes, with a liquid crystal (LC) layer interposed between the two panels.

The LCD displays images by applying voltages to the field-generating electrodes to generate an electric field in the LC layer. The electric field determines orientations of LC molecules in the LC layer to adjust polarization of incident light.

LCDs may include field-generating electrodes on the respective panels. A type of LCD including field-generating electrodes on respective panels includes a plurality of pixel electrodes arranged in a matrix at one panel and a common electrode on the other panel. The common electrode covers an entire surface of the panel. The image display of the LCD is accomplished by applying individual voltages to respective pixel electrodes.

The common electrode, the pixel electrode, and the LC layer form a liquid crystal capacitor, and each pixel includes a switching element connected to the liquid crystal capacitor as well as the liquid crystal capacitor.

Currently, the driving speed of the LCD is being increased to improve the image quality of moving pictures, but it is difficult to charge the liquid crystal capacitor sufficiently when the speed is significantly increased. Therefore, the previous data voltage is pre-charged in the liquid crystal capacitor before it receives its data voltage.

However, the pre-charging generates a shadow phenomenon because the amounts of the pre-capacitance of each pixel are changed depending on the previous data voltage.

SUMMARY OF THE INVENTION

A liquid crystal display is provided, which includes a plurality of pixels including first and second thin film transistors and a pixel electrode connected to the first and second thin film transistors, a first gate line transmitting a first gate signal and connected to the first thin film transistor, a second gate line transmitting a second gate signal and connected to the second thin film transistor, and a data line transmitting a data signal and connected to the first thin film transistor, wherein the second thin film transistor receives a uniform voltage and transmits the uniform voltage to the pixel electrode according to the second gate signal.

The second thin film transistor may be turned on more quickly than the first thin film transistor.

The liquid crystal display may further include a common electrode facing the pixel electrode, and a liquid crystal layer formed between the common electrode and the pixel electrode.

The uniform voltage is the voltage supplied to the common electrode.

A thin film transistor array panel is provided, which includes a gate line formed on an insulating substrate, a data line intersecting the gate line, a shielding electrode formed on the data line, a first thin film transistor connected to the gate line and the data line, a second thin film transistor connected to the gate line and the shielding electrode, a pixel electrode connected to the first and second thin film transistors, and a passivation layer formed between the shielding electrode and the pixel electrode, and the data line.

The shielding electrode may have an opening extended along the data line.

The first thin film transistor may include a first gate electrode connected to the gate line, a first semiconductor overlapping the first gate electrode, a first source electrode connected to the data line and overlapping the first semiconductor, and a first drain electrode overlapping the first semiconductor and connected to the pixel electrode.

The second thin film transistor may include a second gate electrode connected to the gate line, a second semiconductor overlapping the second gate electrode, a second source electrode connected to the shielding electrode and overlapping the second semiconductor, and a second drain electrode overlapping the second semiconductor and connected to the pixel electrode.

The shielding electrode may include a protrusion extended to the second semiconductor, wherein the second source electrode is connected to the protrusion.

The shielding electrode may have a connection connecting the adjacent shielding electrode to each other, and it at least overlaps the gate line.

The second source electrode may be disposed on the gate line and be connected to the connection on the gate line.

BRIEF DESCRIPTION OF THE DRAWINGS

The present invention will become more apparent by describing preferred embodiments thereof in detail with reference to the accompanying drawings in which.

DETAILED DESCRIPTION OF EMBODIMENTS

Figure 1:
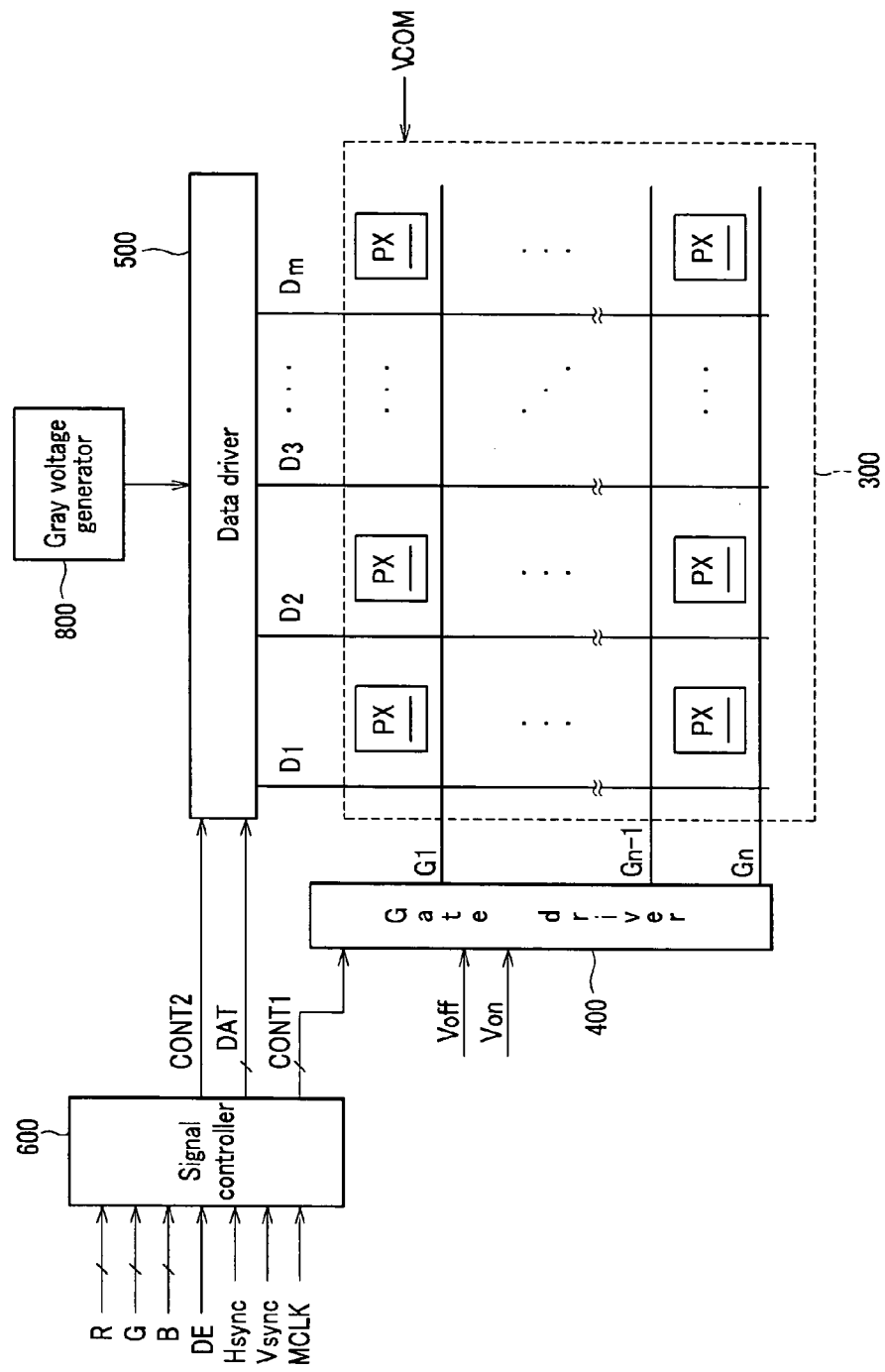
FIG. 1 is a block diagram of a display device according to an embodiment of the present invention.

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
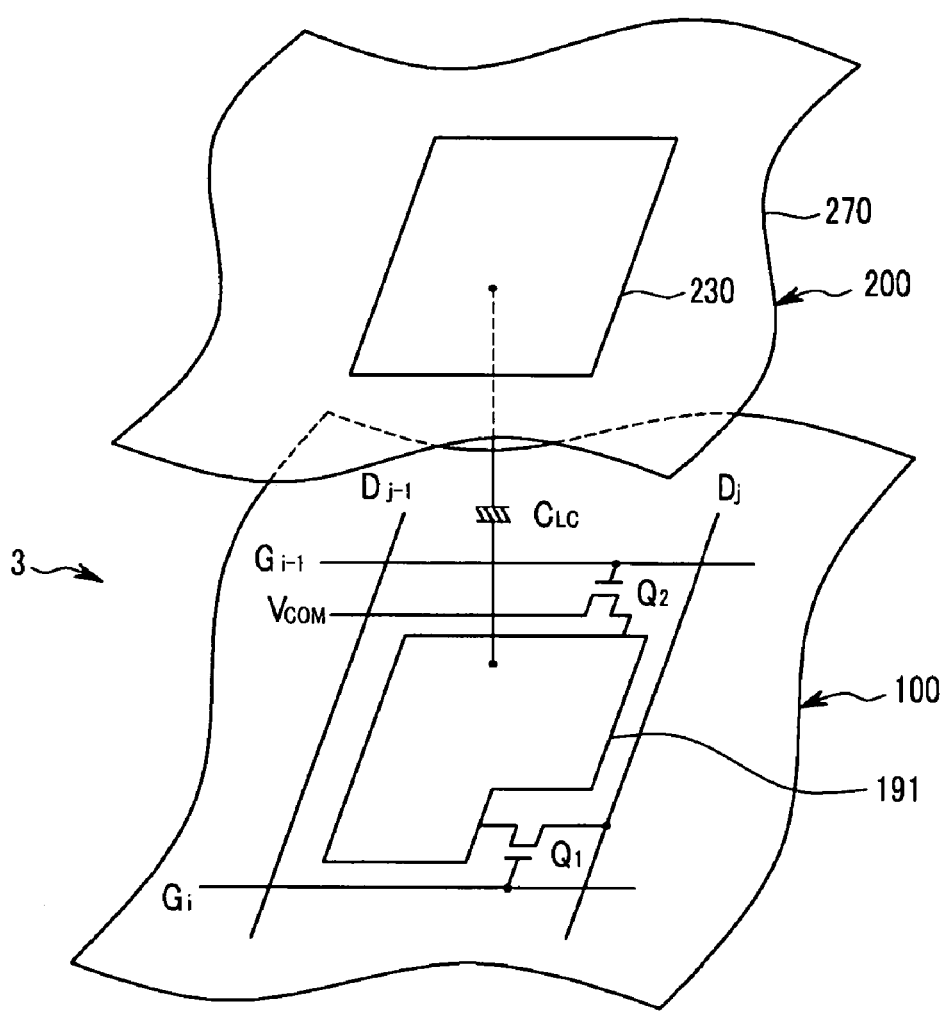
FIG. 2 is an equivalent circuit diagram of a pixel of an LCD as an example of the display device according to an embodiment of the present invention.

Referring to FIGS. 1 and 2, a liquid crystal display according to an embodiment of the present invention will be described in detail.

FIG. 1 is a block diagram of a display device according to an embodiment of the present invention, and FIG. 2 is an equivalent circuit diagram of a pixel of an LCD as an example of the display device according to an embodiment of the present invention.

Referring to FIG. 1, a display device according to the present embodiment includes a liquid crystal panel assembly 300, a gate driver 400 and a data driver 500 that are connected to the liquid crystal panel assembly 300, a gray voltage generator 800 connected to the data driver 500, and a signal controller 600 controlling the above elements.

Referring to FIG. 1, the liquid crystal panel assembly 300 includes a plurality of display signal lines G1-Gn and D1-Dm, and a plurality of pixels PX connected thereto. The pixels PX are arranged substantially in a matrix.

In the structural view shown in FIG. 2, the liquid crystal panel assembly 300 includes a lower panel 100, an upper panel 200, and an LC layer 3 interposed therebetween.

The display signal lines G1-Gn and D1-Dm include a plurality of gate lines G1-Gn transmitting gate signals (also referred to as "scanning signals") and a plurality of data lines D1-Dm transmitting data signals. The gate lines G1-Gn extend substantially in a row direction and are substantially parallel to each other, while the data lines D1-Dm extend substantially in a column direction and are substantially parallel to each other.

Referring to FIG. 2, each pixel PX defined by the 'i'th gate line and the 'j'th data line of a liquid crystal display includes a main switching element Q1 and a sub switching element Q2, and an LC (liquid crystal) capacitor $C_{LC}$. The display signal lines Gi and Dj are provided on the lower panel 100. If necessary, the storage capacitor (not shown) may be added.

Each of the main and sub switching elements Q1 and Q2 such as a TFT is provided on the lower panel 100, and the main switching element Q1 has three terminals: a control terminal connected to the gate line Gi; an input terminal connected to the data line Dj; and an output terminal connected to the LC capacitor $C_{LC}$. The sub switching element Q2 has three terminals: a control terminal connected to the previous gate line Gi-1; an input terminal connected to the common voltage Vcom; and an output terminal connected to the LC capacitor $C_{LC}$.

The LC capacitor $C_{LC}$ includes a pixel electrode 191 provided on the lower panel 100 and a common electrode 270 provided on the upper panel 200, as the two capacitor terminals. The LC layer 3 disposed between the two electrodes 191 and 270 functions as a dielectric for the LC capacitor $C_{LC}$. The pixel electrodes 191 are connected to the main and sub switching elements Q1 and Q2. The common electrode 270 is supplied with a common voltage Vcom and covers the entire surface of the upper panel 200. In other embodiments, the common electrode 270 may be provided on the lower panel 100, and both electrodes 191 and 270 may be provided in the shape of a bar or stripe.

For color displays, each pixel PX uniquely represents one of three primary colors (i.e., spatial division), or each pixel PX sequentially represents all three primary colors in turn (i.e., time division), such that a spatial or temporal sum of the three primary colors is recognized as a desired color. FIG. 2 shows an example of the spatial division type of color display in which each pixel is provided with a color filter 230 representing one of the primary colors, e.g., red, green, or blue, in an area of the upper panel 200 facing a pixel electrode 191. Alternatively, the color filter 230 may be provided on or under the pixel electrode 191 on the lower panel 100.

A pair of polarizers (not shown) for polarizing the light are attached on the outer surfaces of the panels 100 and 200 of the panel assembly 300.

The LCD may further include at least one retardation film (not shown) for compensating the retardation of the LC layer 3.

Referring back to FIG. 1, the gray voltage generator 800 generates two sets of a plurality of gray voltages related to the transmittance of the pixels PX. The gray voltages in one set have a positive polarity with respect to the common voltage Vcom, while those in the other set have a negative polarity with respect to the common voltage Vcom.

The gate driver 400 is connected to the gate lines G1-Gn of the liquid crystal panel assembly 300, and synthesizes the gate-on voltage Von and the gate-off voltage Voff from an external device to generate gate signals for application to the gate lines G1-Gn. The gate driver 400 may be mounted on the liquid crystal panel assembly 300, and may comprise a plurality of IC (integrated circuit) chips. Each IC chip of the gate driver 400 is respectively connected to the gate lines G1-Gn and includes a plurality of thin film transistors.

The data driver 500 is connected to the data lines D1-Dm of the liquid crystal panel assembly 300 and applies data voltages, which are selected from the gray voltages supplied from the gray voltage generator 800, to the data lines D1-Dm. The data driver 500 may also mounted on the panel assembly 300 and may also comprise a plurality of IC chips.

The IC chips of the drivers 400 and 500 may be mounted on flexible printed circuit (FPC) films as a TCP (tape carrier package), and are attached to the liquid crystal panel assembly 300. Alternatively, the drivers 400 and 500 may be integrated into the liquid crystal panel assembly 300 along with the display signal lines G1-Gn and D1-Dm and the TFT switching elements Q1 and Q2.

The IC chips of the drivers 400 and 500, or the flexible printed circuit (FPC) films, are located at a peripheral area of the liquid crystal panel assembly 300.

The signal controller 600 generates control signals for controlling the drivers 400 and 500 and provides the corresponding control signals for the drivers 400 and 500.

Now, the operation of the LCD will be described in detail.

The signal controller 600 is supplied with image signals R, G, and B and input control signals for controlling the display thereof, such as a vertical synchronization signal Vsync, a horizontal synchronization signal Hsync, a main clock signal MCLK, and a data enable signal DE, from an external graphic controller (not shown). After generating gate control signals CONT1 and data control signals CONT2 and processing the image signals R, G, and B to be suitable for the operation of the panel assembly 300 on the basis of the input control signals, the signal controller 600 provides the gate control signals CONT1 for the gate driver 400, and the processed image data DAT and the data control signals CONT2 for the data driver 500.

The gate control signals CONT1 include a scanning start signal STV for instructing the gate driver 400 to start scanning, and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing the data driver 500 of start of data transmission for image data DAT of a group of pixels, a load signal LOAD for instructing the data driver 500 to apply the data voltages to the data lines $D_1$-$D_M$, and a data clock signal HCLK. The data control signal CONT2 may further include an inversion signal RVS for reversing the polarity of the data voltages (with respect to the common voltage Vcom).

The data driver 500 receives a packet of the image data DAT for a pixel row from the signal controller 600, and converts the image data DAT into the analogue data voltages selected from the gray voltages supplied from the gray voltage generator 800 in response to the data control signals CONT2 from the signal controller 600.

In response to the gate control signals CONT1 from the signal controller 600, the gate driver 400 applies the gate-on voltage Von to the gate line G1-Gn. Each of the gate lines G1-Gn are connected to the main switching elements Q1 of the corresponding pixel row and to the sub switching elements Q2 of the following pixel row, thereby simultaneously turning on the main and the sub switching elements Q1 and Q2 connected thereto. Accordingly, the data voltage applied to the data lines D1-Dm is supplied to the pixels of one row through the main switching element Q1, while the common voltage as a pre-charging voltage is supplied to the pixels of the following row through the sub switching element Q2.

The difference between the data voltage and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts light polarization into light transmittance.

The row pixel applied by the common voltage through the sub switching element Q2 receives the corresponding data voltage through the main switching element Q1 after the 1 horizontal period (1 H).

By repeating this procedure by a unit of the horizontal period (which is indicated by 1 H and is equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may also be controlled such that the polarity of the data voltages flowing in a data line in one frame are reversed (for example, line inversion and dot inversion), or the polarity of the data voltages in one packet are reversed (for example, column inversion and dot inversion).

As above-described, the common voltage as a pre-charging voltage is supplied to all pixels with the same voltage, and accordingly the charging ratio thereof may be uniform.

The liquid crystal panel assembly of an LCD according to one embodiment of the present invention will now be described in detail with reference to FIGS. 3 and 4 as well as FIGS. 1 and 2.

Figure 3:
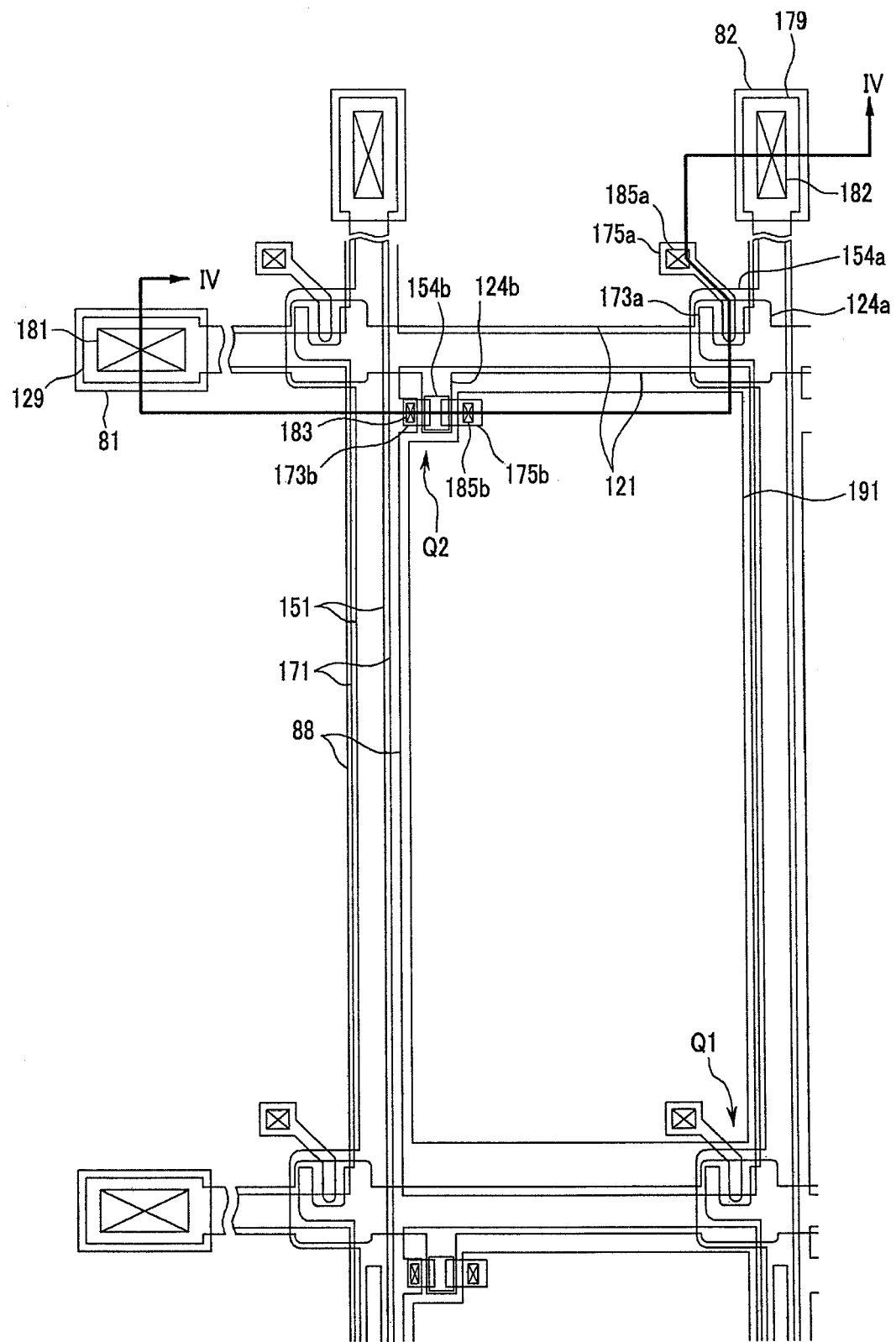
FIG. 3 is a layout view of a lower panel for an LCD according to an embodiment of the present invention.
Figure 4:
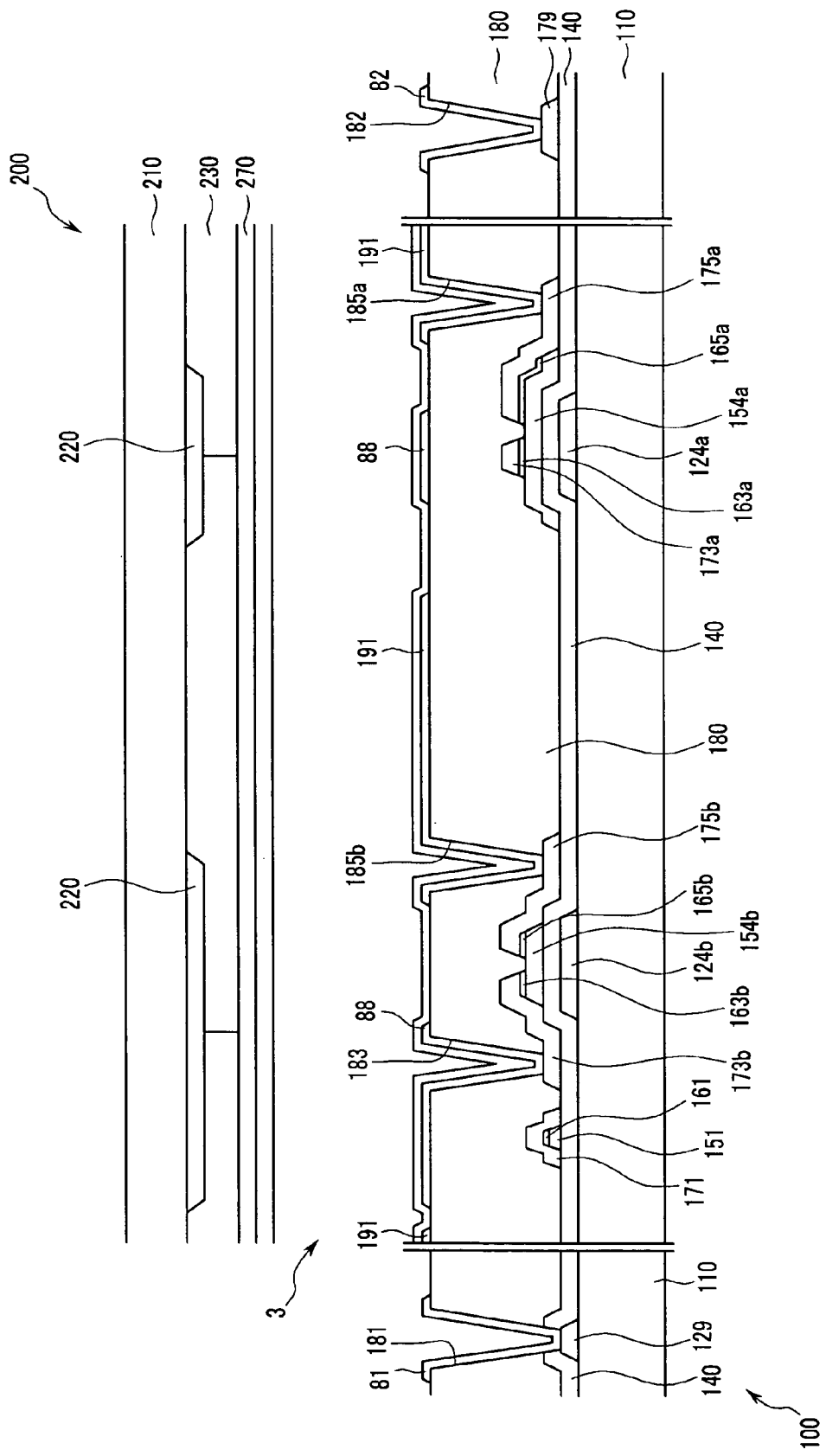
FIG. 4 is a sectional view of the LCD including an upper panel in addition to the lower panel shown in FIG. 3 taken along the line IV-IV.

FIG. 3 is a layout view of a lower panel of the liquid crystal panel assembly shown in FIGS. 1 and 2 according to an embodiment of the present invention, and FIG. 4 is a sectional view of the liquid crystal panel assembly including the lower panel in FIG. 3 taken along the lines IV-IV.

The common electrode panel 200 will now be described in detail.

A light blocking member 220 referred to as a black matrix for preventing light leakage is formed on an insulating substrate 210 made of a material such as transparent glass or plastic. The light blocking member 220 may be a single layer made of chromium or a double layer made of chromium and chromium nitride, and may be made of organic material including a black pigment.

A plurality of color filters 230 are also formed on the substrate 210, and they are disposed substantially in the areas enclosed by the light blocking member 220. The color filters 230 may extend substantially along the longitudinal direction, and the edge of the adjacent color filters 230 may overlap each other.

A common electrode 270 is formed on the color filters 230. The common electrode 270 is preferably made of transparent conductive material such as ITO and IZO.

An overcoat (not shown) may be added between the color filters 230 and the common electrode 270 to prevent the color filters 230 from being exposed or to provide a flat surface.

The TFT array panel 100 will now be described in detail.

A plurality of gate lines 121 are formed on an insulating substrate 110. The gate lines 121 are for transmitting gate signals, and they extend substantially in a transverse direction and are separated from each other. Each gate line 121 includes a plurality of projections forming a plurality of first and second gate electrodes 124a and 124b respectively protruding downward and upward, and an end portion 129 having a large area for contact with another layer or an external device. The end portions 129 might not be provided when a gate driving circuit (not shown) is integrated on the substrate 110 such that the gate lines 121 are in direct contact with the gate driving circuit.

The gate lines 121 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, they may have a multi-layered structure including two conductive films (not shown) having different physical characteristics. One of the two films is preferably made of a low resistivity metal including an Al-containing metal, a Ag-containing metal, and a Cu-containing metal for reducing signal delay or voltage drop. The other film is preferably made of a material such as a Mo-containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate lines 121 may be made of various metals or conductors.

In addition, the lateral sides of the gate lines 121 are inclined relative to a surface of the substrate 110, and the inclination angle thereof ranges about 30-80 degrees.

A gate insulating layer 140 preferably made of silicon nitride (SiNx) is formed on the gate lines 121.

A plurality of semiconductor stripes 151 and a plurality of semiconductor islands 154b, which are preferably made of hydrogenated amorphous silicon (abbreviated as "a-Si") or polysilicon, are formed on the gate insulating layer 140. Each semiconductor stripe 151 extends substantially in the longitudinal direction and is periodically curved. Each semiconductor stripe 151 has a plurality of projections 154a branched out toward the first gate electrodes 124a. Each semiconductor island 154b is disposed on the second gate electrodes 124b.

A plurality of ohmic contact stripes 161 and islands 163b, 165a, and 165b preferably made of silicide or n+hydrogenated a-Si heavily doped with an N-type impurity are formed on the semiconductor stripes and islands 151 and 154b. Each ohmic contact stripe 161 has a plurality of projections 163a, and the projections 163a, and the ohmic contact islands 165a are located in pairs on the projections 154a of the semiconductor stripes 151a. The ohmic contact islands 163b and 165b are located in pairs on the semiconductor islands 154b.

The lateral sides of the semiconductors 151 and 154b, and the ohmic contacts 161, 163b, 165a, and 165b are inclined relative to the surface of the substrate 110, and the inclination angles thereof are preferably in a range between about 30-80 degrees.

A plurality of data lines 171, a plurality of second source electrodes 173b, and a plurality of first and second drain electrodes 175a and 175b separated from each other are formed on the ohmic contacts 161, 163b, 165a, and 165b and the gate insulating layer 140.

The data lines 171 for transmitting data voltages extend substantially in the longitudinal direction and intersect the gate lines 121. Each data line 171 has an end portion 179 having a large area for contact with another layer or an external device and a first source electrode 173a. Each first source electrode 173a is extended to the first gate electrode 124a and encloses the first drain electrode 175a with "U" shape.

The second source electrode 173b is separated from the data lines 171 and at least overlaps a portion of the second gate electrode 124b Each of the first and second drain electrodes 175a and 175b are respectively separated from the data line 171 and the second source electrode 175b, and are respectively disposed opposite the first and second source electrodes 173a and 173b with the respect to the first and second gate electrodes 124a and 124b. The first drain electrode 175a includes an end portion having a large area for contact with another layer and another end portion enclosed by the first source electrode 173a.

Each set of the first gate electrode 124a, the first source electrode 173a, and the first drain electrode 175a along with a projection 154a of a semiconductor stripe 151 form a TFT Q1 having a channel formed in the semiconductor projection 154a disposed between the first source electrode 173a and the first drain electrode 175a. Each set of the second gate electrode 124b, the second source electrode 173b, and the second drain electrode 175b along with the second semiconductor islands 154b form a TFT Q2 having a channel formed in the semiconductor island 154b disposed between the second source electrode 173b and the second drain electrode 175b.

The data lines 171, the second source electrodes 173a, and the drain electrodes 175a and 175b are preferably made of a refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171 and 175 may be made of various metals or conductors.

Like the gate lines 121, the data lines 171, the second source electrodes 173a, and the drain electrodes 175a and 175b have inclined lateral sides, and the inclination angles thereof range about 30-80 degrees.

The ohmic contacts 161, 163b, 165a, and 165b are interposed only between the underlying semiconductors 151 and 154b, and the overlying data lines 171, the second source electrodes 173b, and the overlying drain electrodes 175a and 175b thereon, and reduce the contact resistance therebetween. Although the semiconductor stripes 151 are narrower than the data lines 171 at most places, the width of the semiconductor stripes 151 becomes large near the gate lines 121 as described above, to smooth the profile of the surface, thereby preventing disconnection of the data lines 171. The semiconductors 154a and 154b respectively include a plurality of exposed portions, which are not covered with the data lines 171 and the first and the second drain electrodes 175a and 175b, such as portions respectively located between the first and second source electrodes 173a and 173b, and the first and second drain electrodes 175a 175b.

A passivation layer 180 is formed on the data lines 171, the second source electrodes 173b, and the drain electrodes 175a and 175b, and exposed portions of the semiconductors 151 and 154b that are not covered with the data lines 171, the second source electrodes 173b, and the drain electrodes 175a and 175b. The passivation layer 180 is preferably made of a photosensitive organic material having a good flatness characteristic, a low dielectric insulating material such as a-Si: C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film in order to prevent the channel portions of the semiconductor 151 and 154b from being in direct contact with organic material.

The passivation layer 180 has a plurality of contact holes 182, 183, 185a, and 185b exposing the end portions 179 of the data lines 171, the second source electrodes 173b, and the drain electrodes 175a and 175b, respectively. The passivation layer 180 and the gate insulating layer 140 have a plurality of contact holes 181 exposing the end portions 129 of the gate lines 121.

A plurality of pixel electrodes 191, a plurality of contact assistants 81 and 82, and a plurality of shielding electrodes 88, which are preferably made of a transparent conductive material such as ITO or IZO, are formed on the passivation layer 180. For a reflective LCD, the pixel electrodes 191 may be made of an opaque reflective material such as Ag or Al.

The pixel electrodes 191 are physically and electrically connected to the first and second drain electrodes 175a and 175b through the contact holes 185a and 185b such that the pixel electrodes 191 receive the data/common voltages from the first and second drain electrodes 175a and 175b.

The pixel electrodes 191 supplied with the data voltages generate electric fields in cooperation with the common electrode 270, which reorient liquid crystal molecules of the LC layer 3 disposed therebetween.

A pixel electrode 191 and the common electrode 270 form a capacitor called a "liquid crystal capacitor," which stores applied voltages after turn-off of the main TFT Q1. An additional capacitor called a "storage capacitor," which is connected in parallel to the liquid crystal capacitor, may be provided for enhancing the voltage storing capacity.

The shielding electrode 88 is supplied with the common voltage, and it includes longitudinal portions extending along the data lines 171 and transverse portions extending along the gate lines 121 to connect adjacent longitudinal portions. The longitudinal portions fully cover the data lines 171, while each of the transverse portions lies within the boundary of a gate line 121, and the longitudinal portions include a plurality of protrusions connected to the second source electrodes 173b through the contact holes 183.

The shielding electrode 88 blocks electromagnetic interference between the data lines 171 and the pixel electrodes 191 and between the data lines 171 and the common electrode 270 to reduce the distortion of the voltage of the pixel electrodes 190 and the signal delay of the data voltages carried by the data lines 171.

Furthermore, since the pixel electrodes 191 are required to be spaced apart from the shielding electrodes 88 for preventing a short therebetween, the pixel electrodes 191 become farther from the data lines 171 such that the parasitic capacitance therebetween is reduced.

Moreover, since the permittivity of the LC layer 3 is larger than that of the passivation layer 180, the parasitic capacitance between the data lines 171 and the shielding electrodes 88 is reduced compared with that between the data lines 171 and the common electrode 270 without the shielding electrodes 88.

In addition, the distance between the pixel electrodes 191 and the shielding electrodes 88 can be uniformly maintained since they are made at the same layer and thus the parasitic capacitance therebetween can be made to be uniform.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed end portions 129 and 179 and complement the adhesion between the exposed end portions 129 and 179 and external devices.

Figure 5:
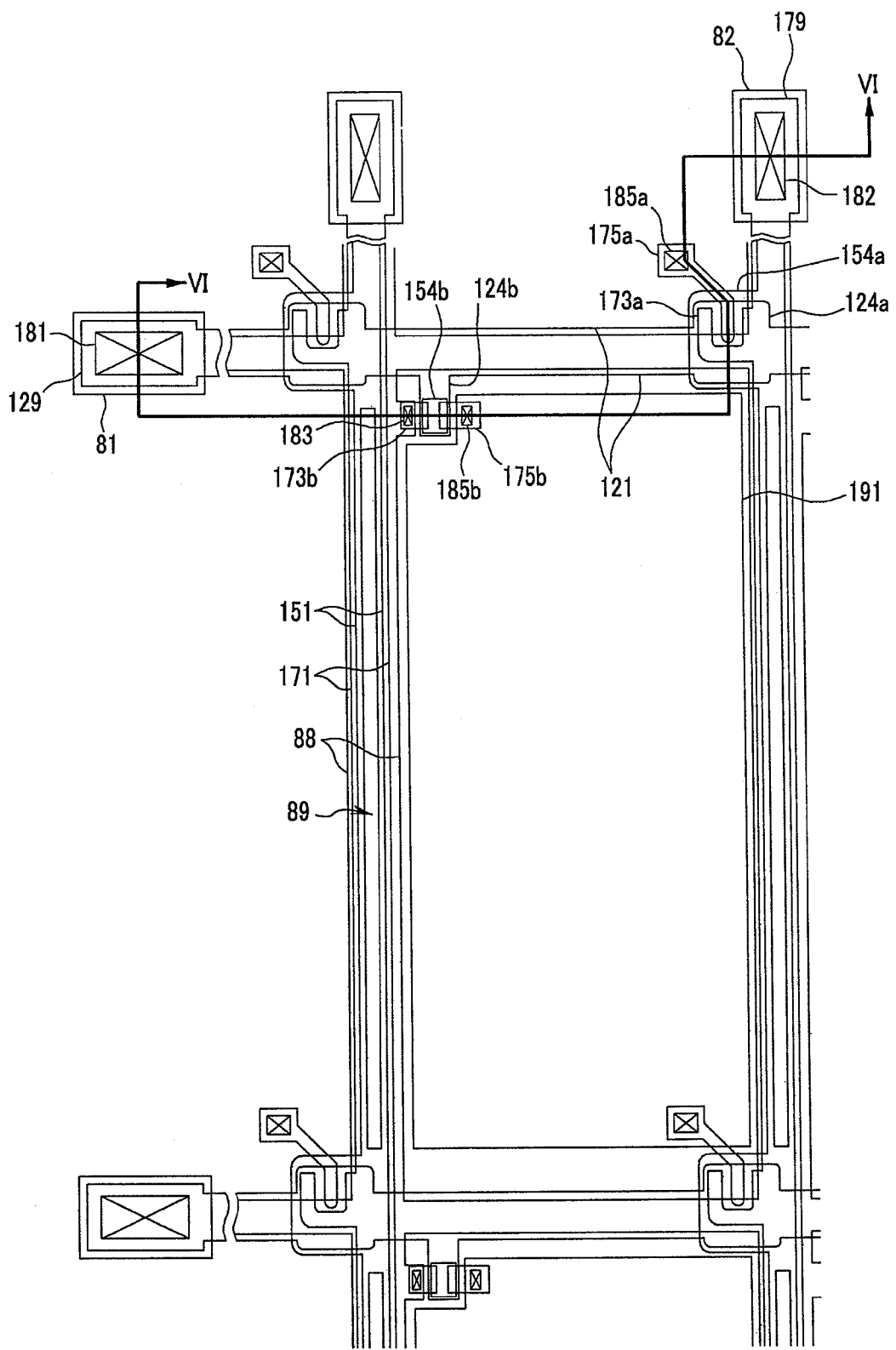
FIG. 5 is a layout view of a thin film transistor array panel for an LCD according to another embodiment of the present invention.
Figure 6:
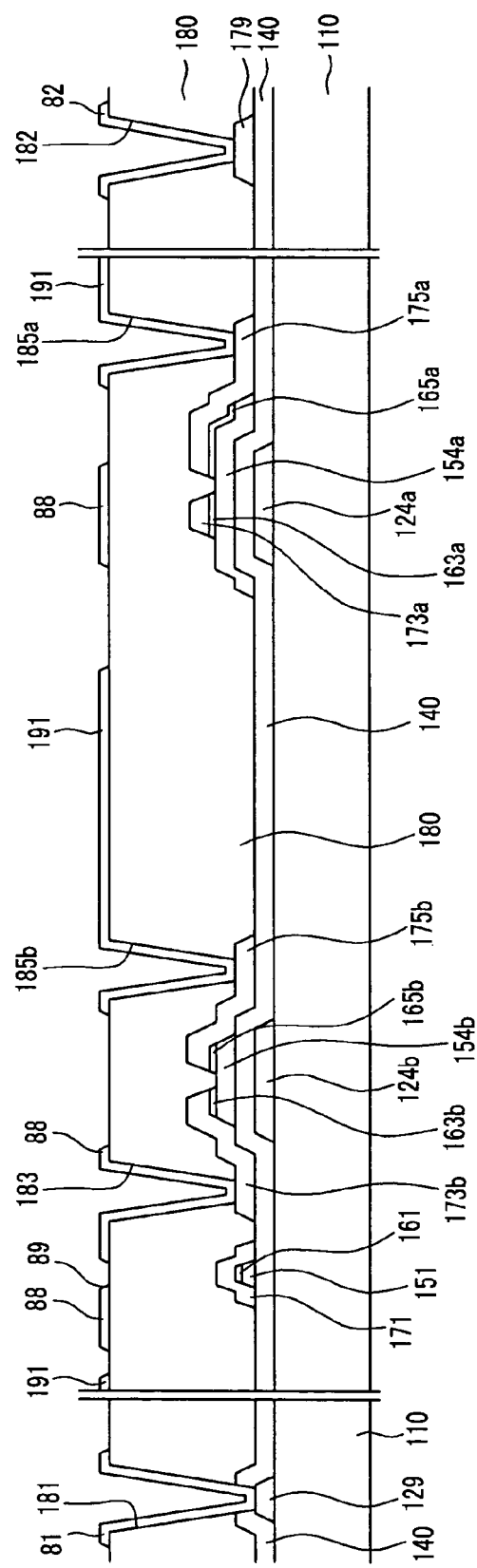
FIG. 6 is a sectional view of the thin film transistor array panel shown in FIG. 5 taken along the line VI-VI.

FIG. 5 is a layout view of a thin film transistor array panel for an LCD according to another embodiment of the present invention, and FIG. 6 is a sectional view of the thin film transistor array panel shown in FIG. 5 taken along the line VI-VI.

Referring to FIGS. 5 and 6, layered structures of the panel 100 according to this embodiment are almost the same as those shown in FIGS. 3 and 4.

A plurality of gate lines 121 including a plurality of gate electrodes 124a and 124b and a plurality of end portions 129 are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163a, and a plurality of ohmic contact islands 163b, 165a, and 165b, are sequentially formed thereon. A plurality of data lines 171 including a plurality of first source electrodes 173a, a plurality of second source electrodes 173b, and a plurality of first and second drain electrodes 175a and 175b are formed on the ohmic contacts 161, 163b, 165a, and 165b, and a passivation layer 180 is formed thereon. A plurality of contact holes 181, 182, 183, 185a, and 185b are provided at the passivation layer 180 and the gate insulating layer 140. A plurality of pixel electrodes 191, a plurality of shielding electrodes 88, and a plurality of contact assistants 81 and 82 are formed on the passivation layer 180.

Differing from the LCD shown in FIGS. 3 and 4, the shielding electrodes 88 include a plurality of openings 89 disposed at the longitudinal portions of the shielding electrodes 88 and extended to the data lines 171 in this embodiment.

In this embodiment, the parasitic capacitance between the data lines 171 and the shielding electrode 88 may be reduced due to the openings 89 of the shielding electrodes 88, such that the delay of the signals applied to the data lines 171 may be reduced.

Figure 7:
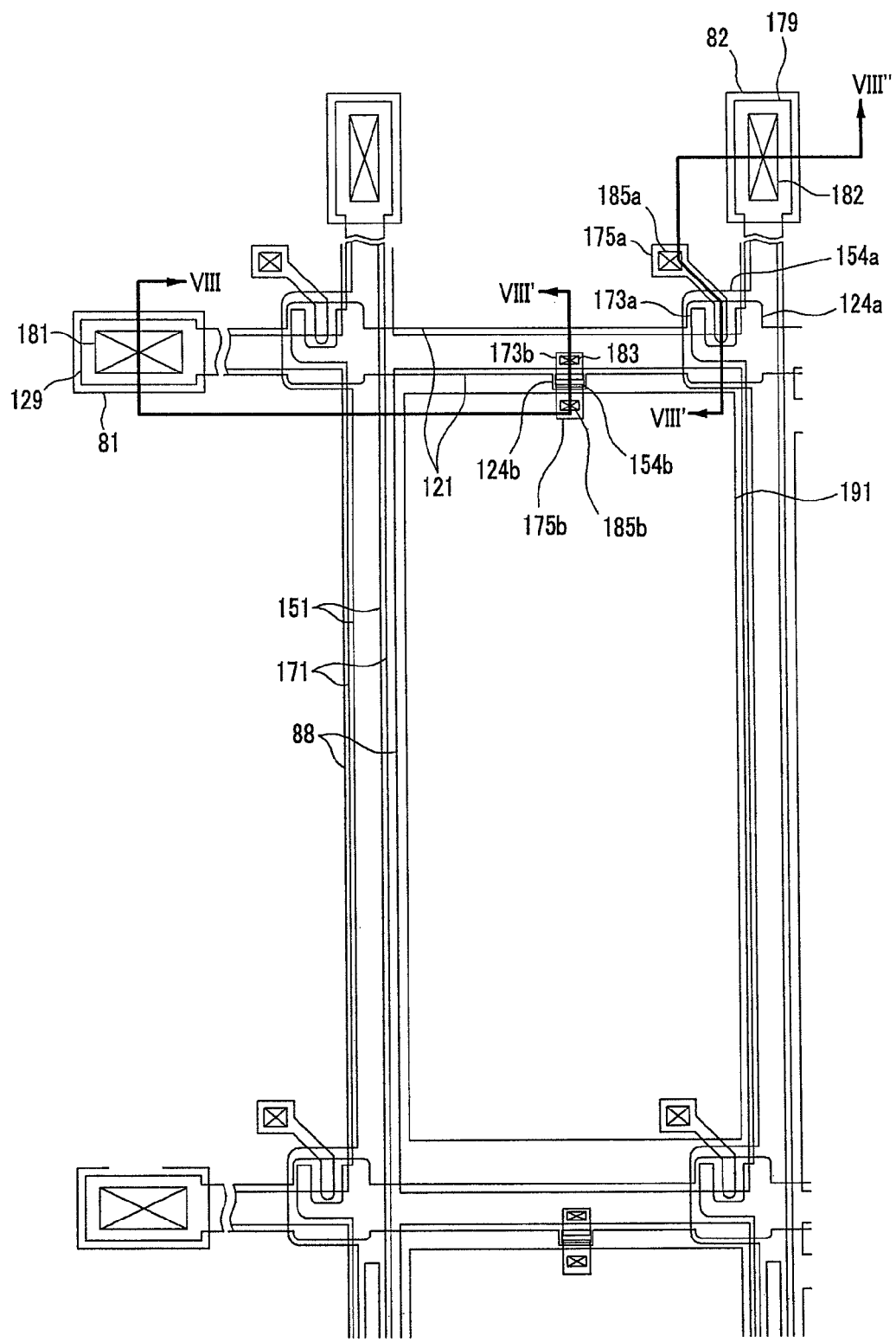
FIG. 7 is a layout view of a thin film transistor array panel for an LCD according to another embodiment of the present invention.
Figure 8:
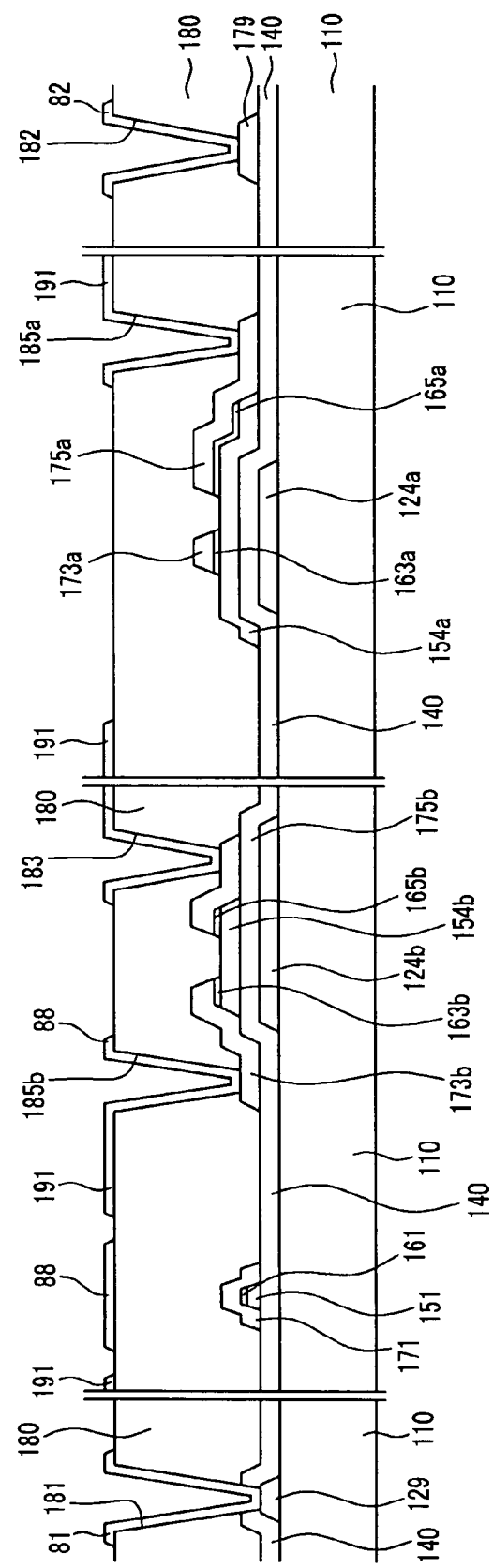
FIG. 8 is a sectional view of the thin film transistor array panel shown in FIG. 7 taken along the line VIII-VIII.

FIG. 7 is a layout view of a thin film transistor array panel for an LCD according to another embodiment of the present invention, and FIG. 8 is a sectional view of the thin film transistor array panel shown in FIG. 7 taken along the line VIII-VIII'-VIII".

Referring to FIGS. 7 and 8, layered structures of the panels 100 according to this embodiment are almost the same as those shown in FIGS. 3 and 4.

A plurality of gate lines 121 including a plurality of gate electrodes 124a and 124b and a plurality of end portions 129 are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163a, and a plurality of ohmic contact islands 163b, 165a, and 165b, are sequentially formed thereon. A plurality of data lines 171 including a plurality of first source electrodes 173a, a plurality of second source electrodes 173b, and a plurality of first and second drain electrodes 175a and 175b are formed on the ohmic contacts 161, 163b, 165a, and 165b, and a passivation layer 180 is formed thereon. A plurality of contact holes 181, 182, 183, 185a, and 185b are provided at the passivation layer 180 and the gate insulating layer 140. A plurality of pixel electrodes 191, a plurality of shielding electrodes 88, and a plurality of contact assistants 81 and 82 are formed on the passivation layer 180.

Differing from the LCD shown in FIGS. 3 and 4, the second source electrodes 173b overlap the gate lines 121 and the transverse portions of the shielding electrodes 88, and the contact holes 183 are disposed under the transverse portions of the shielding electrodes 88 in this embodiment. Accordingly, the aperture ratio of the pixel may be maximized.

Figure 9:
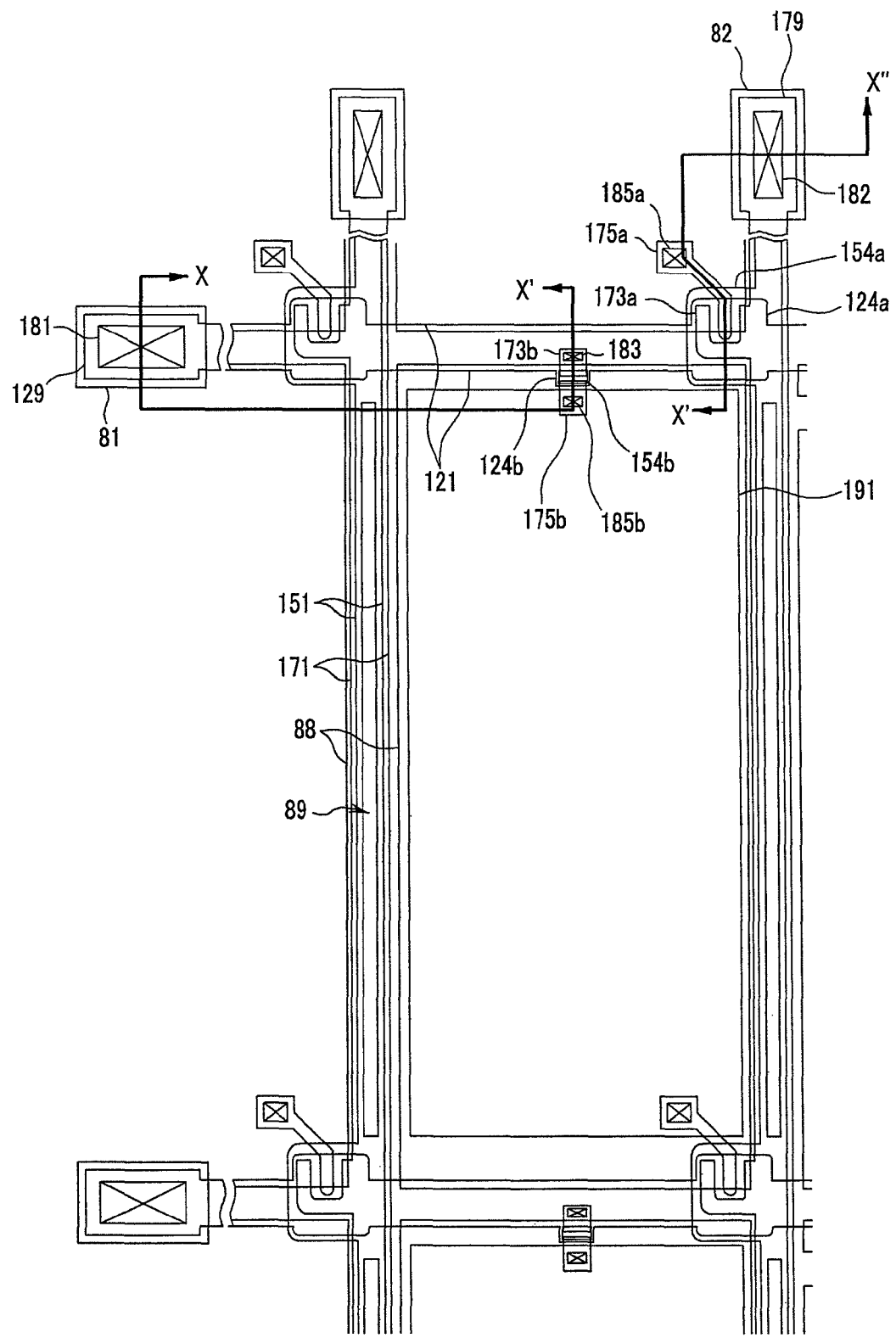
FIG. 9 is a layout view of a thin film transistor array panel for an LCD according to another embodiment of the present invention.
Figure 10:
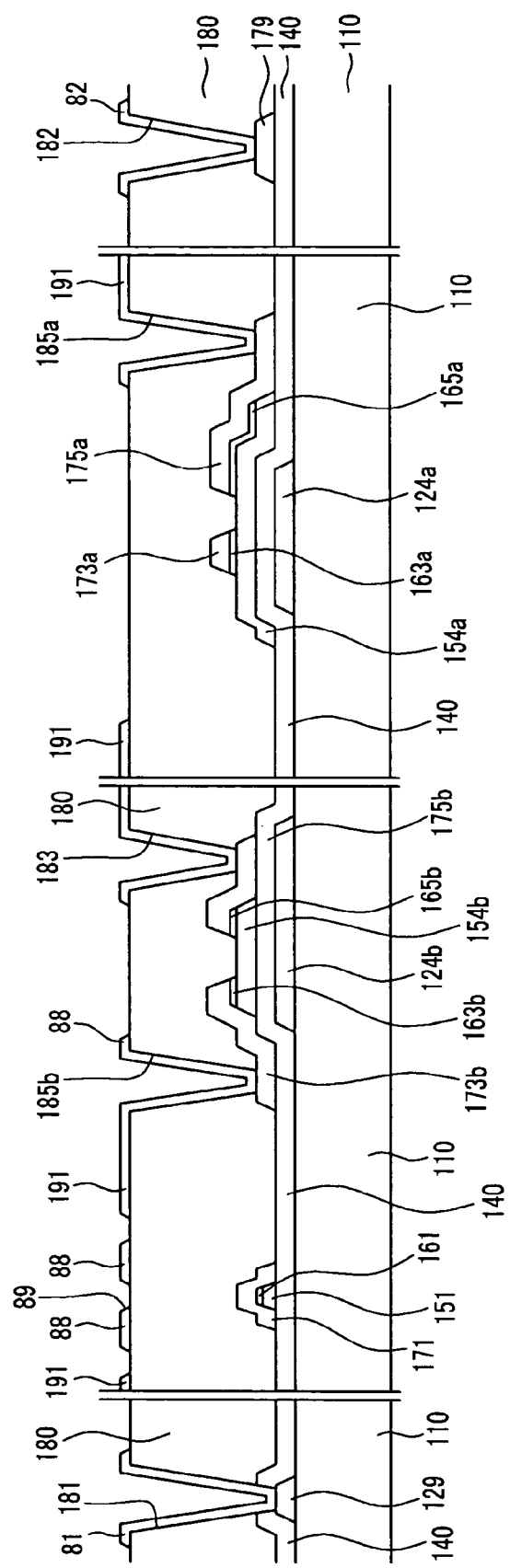
FIG. 10 is a sectional view of the thin film transistor array panel shown in FIG. 9 taken along the lines X-X'-X"

FIG. 9 is a layout view of a thin film transistor array panel for an LCD according to another embodiment of the present invention, and FIG. 10 is a sectional view of the thin film transistor array panel shown in FIG. 9 taken along the line X-X'-X".

Referring to FIGS. 9 and 10, layered structures of the panels 100 according to this embodiment are almost the same as those shown in FIGS. 7 and 8.

A plurality of gate lines 121 including a plurality of gate electrodes 124a and 124b and a plurality of end portions 129 are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163a, and a plurality of ohmic contact islands 163b, 165a, and 165b, are sequentially formed thereon. A plurality of data lines 171 including a plurality of first source electrodes 173a, a plurality of second source electrodes 173b, and a plurality of first and second drain electrodes 175a and 175b are formed on the ohmic contacts 161, 163b, 165a, and 165b, and a passivation layer 180 is formed thereon. A plurality of contact holes 181, 182, 183, 185a, and 185b are provided at the passivation layer 180 and the gate insulating layer 140. A plurality of pixel electrodes 191, a plurality of shielding electrodes 88, and a plurality of contact assistants 81 and 82 are formed on the passivation layer 180.

Differing from the LCD shown in FIGS. 7 and 8, the shielding electrodes 88 include a plurality of openings 89 disposed at the longitudinal portions of the shielding electrodes 88 and overlapping the data lines 171 in this embodiment.

In this embodiment, the parasitic capacitances between the data lines 171 and the shielding electrode 88 may be also be reduced due to the openings 89 of the shielding electrodes 88, such that the delay of the signals applied to the data lines 171 may be reduced.

Figure 11:
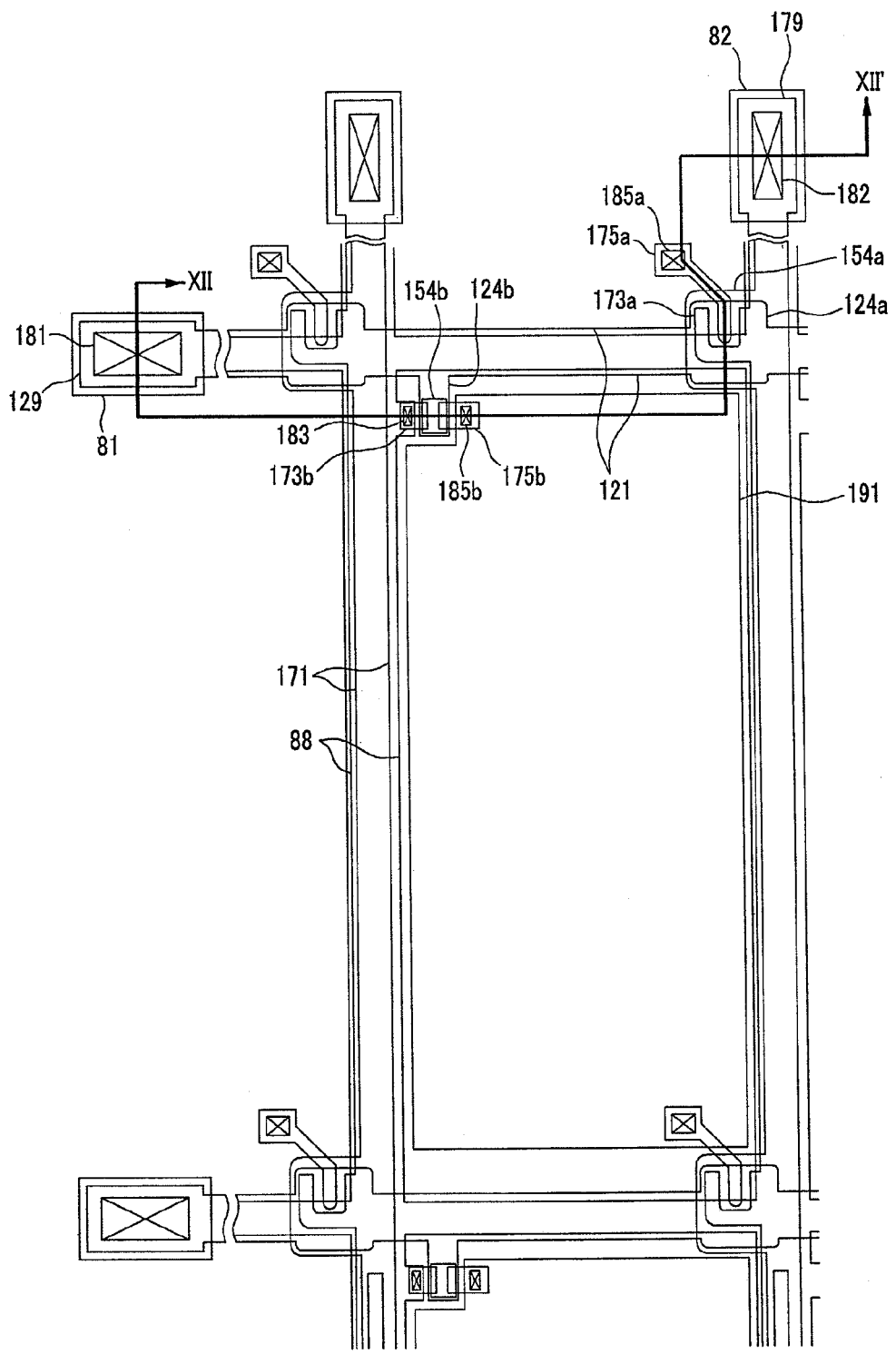
FIG. 11 is a layout view of a thin film transistor array panel for an LCD according to another embodiment of the present invention.
Figure 12:
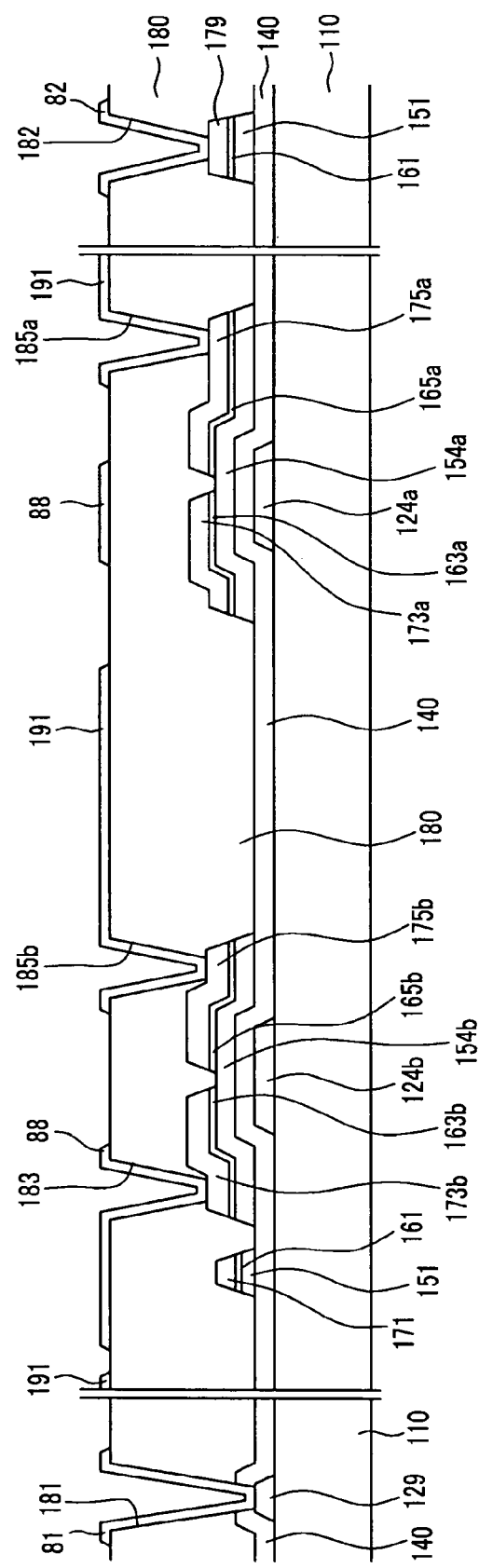
FIG. 12 is a sectional view of the thin film transistor array panel shown in FIG. 11 taken along the lines XII-XII.

FIG. 11 is a layout view of a thin film transistor array panel for an LCD according to another embodiment of the present invention, and FIG. 12 is a sectional view of the thin film transistor array panel shown in FIG. 11 taken along the line XII-XII.

Referring to FIGS. 11 and 12, layered structures of the panels 100 according to this embodiment are almost the same as those shown in FIGS. 3 and 4.

A plurality of gate lines 121 including a plurality of gate electrodes 124a and 124b and a plurality of end portions 129 are formed on a substrate 110, and a gate insulating layer 140, a plurality of semiconductor stripes 151 including a plurality of projections 154a and a plurality of semiconductor islands 154b, and a plurality of ohmic contact stripes 161 including a plurality of projections 163a and a plurality of ohmic contact islands 163b, 165a, and 165b are sequentially formed thereon. A plurality of data lines 171 including a plurality of first source electrodes 173a, a plurality of second source electrodes 173b, and a plurality of first and second drain electrodes 175a and 175b are formed on the ohmic contacts 161, 163b, 165a, and 165b, and a passivation layer 180 is formed thereon. A plurality of contact holes 181, 182, 183, 185a, and 185b are provided at the passivation layer 180 and the gate insulating layer 140. A plurality of pixel electrodes 191, a plurality of shielding electrodes 88, and a plurality of contact assistants 81 and 82 are formed on the passivation layer 180.

Differing from the LCD shown in FIGS. 3 and 4, the semiconductor stripes 151 have almost the same planar shapes as the data lines 171 and the drain electrodes 175a and 175b as well as the underlying ohmic contacts 161, 165a, and 165b. However, the projections 154a of the semiconductor stripes 151 and the semiconductor islands 154b include some exposed portions, which are not covered with the data lines 171 and the drain electrodes 175a and 175b, such as portions located between the source electrodes 173a and 173b and the drain electrodes 175a and 175b.

A manufacturing method of the TFT array panel according to one embodiment simultaneously forms the data lines 171, the second source electrodes 173b, the drain electrodes 175a and 175b, the semiconductors 151 and 154b, and the ohmic contacts 161, 163b, 165a, and 165b using one photolithography process.

A photoresist pattern for the photolithography process has position-dependent thickness, and in particular, it has first and second portions with decreased thickness. The first portions are located on wire areas that will be occupied by the data lines 171, the second source electrodes 173b, and the drain electrodes 175a and 175b, and the second portions are located on channel areas of TFTs Q1 and Q2.

The position-dependent thickness of the photoresist can be obtained by several techniques, for example, by providing translucent areas on the exposure mask as well as transparent areas and light blocking opaque areas. The translucent areas may have a slit pattern, a lattice pattern, or be a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask with only transparent areas and opaque areas, it is subject to a reflow process to flow onto areas without the photoresist, thereby forming thin portions.

As a result, the manufacturing process is simplified by omitting a photolithography step.

Many of the above-described features of the LCD shown in FIGS. 1-10 may be appropriate for the LCD shown in FIGS. 11 and 12.

As above-described, the common voltage as a pre-charging voltage is supplied to all the pixels as the same voltage by using the shielding electrode for the pre-charge operation, and accordingly the characteristics of the display device may be uniform and stable.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
   a plurality of pixels, wherein a first pixel and a second pixel of the plurality of the pixels respectively include a first thin film transistor and a second thin film transistor and a pixel electrode connected to the first thin film transistor and the second thin film transistors, and wherein a shielding electrode is formed on the same layer as the pixel electrode and connected to the second thin film transistor of the first pixel;
   a first gate line transmitting a first gate signal and connected to the first thin film transistor of the first pixel;
   a second gate line transmitting a second gate signal and connected to the second thin film transistor of the first pixel, wherein the second gate signal is applied to the first thin film transistor of the second pixel; and
   a data line transmitting a data signal and connected to the first thin film transistor of the first pixel, wherein the second thin film transistor of the first pixel receives a common voltage from the shielding electrode and transmits the common voltage to the pixel electrode of the first pixel according to the second gate signal,
   wherein after the pixel electrode is pre-charged by the second thin film transistor of the first pixel, the pixel electrode is charged by the first thin film transistor of the first pixel.

2. The liquid crystal display of claim 1, wherein the second thin film transistor of the first pixel is turned on prior to the first thin film transistor of the first pixel.

3. The liquid crystal display of claim 1, further comprising:
   a common electrode facing the pixel electrode; and
   a liquid crystal layer formed between the common electrode and the pixel electrode.

4. The liquid crystal display of claim 3, wherein the common voltage is the voltage supplied to the common electrode.

5. A thin film transistor array panel comprising:
a first gate line and a second gate line disposed on an insulating substrate;
a data line intersecting the first gate line and the second gate line;
a shielding electrode formed on the data line;
a first thin film transistor connected to the first gate line and the data line;
a second thin film transistor connected to the second gate line and the shielding electrode;
a pixel electrode connected to the first thin film transistor and the second thin film transistors, wherein the pixel electrode and the shielding electrode are formed on the same layer,
wherein the shielding electrode is connected to and provides a common voltage to the second thin film transistor, and
wherein a passivation layer is formed under the shielding electrode and the pixel electrode, and over the data line,
wherein after the pixel electrode is pre-charged by the second thin film transistor of the first pixel, the pixel electrode is charged by the first thin film transistor of the first pixel.

6. The thin film transistor array panel of claim 5, wherein the shielding electrode has an opening extended along the data line.

7. The thin film transistor array panel of claim 5, wherein the first thin film transistor includes:
a first gate electrode connected to the first gate line;
a first semiconductor overlapping the first gate electrode;
a first source electrode connected to the data line and overlapping the first semiconductor; and
a first drain electrode overlapping the first semiconductor and connected to the pixel electrode.

8. The thin film transistor array panel of claim 7, wherein the second thin film transistor includes:
a second gate electrode connected to the second gate line;
a second semiconductor overlapping the second gate electrode;
a second source electrode connected to the shielding electrode and overlapping the second semiconductor; and
a second drain electrode overlapping the second semiconductor and connected to the pixel electrode.

9. The thin film transistor array panel of claim 8, wherein the shielding electrode comprises a protrusion extended to the second semiconductor, wherein the second source electrode is connected to the protrusion.

10. The thin film transistor array panel of claim 8, wherein the shielding electrode further comprising a connection extending along the second gate line and overlapping the second gate line.

11. The thin film transistor array panel of claim 10, wherein the second source electrode is disposed on the second gate line and is connected to the connection on the second gate line.

12. The liquid crystal display of claim 1, wherein the pixel electrode is disposed over greater than half of an area of the first pixel.

* * * * *